(12) United States Patent
Kumano

(10) Patent No.: US 9,103,314 B2
(45) Date of Patent: Aug. 11, 2015

(54) WATER WHEEL IMPELLER BLADE TYPE ELECTRIC POWER GENERATING APPARATUS

(75) Inventor: Katsuyuki Kumano, Tokyo (JP)

(73) Assignee: JAPAN SYSTEM PLANNING CO., LTD., Tokyo (JP)

( * ) Notice: Subject to any disclaimer, the term of this patent is extended or adjusted under 35 U.S.C. 154(b) by 553 days.

(21) Appl. No.: 13/427,020

(22) Filed: Mar. 22, 2012

(65) Prior Publication Data

US 2012/0243987 A1    Sep. 27, 2012

(30) Foreign Application Priority Data

Mar. 24, 2011    (JP) .................................. 2011-065957

(51) Int. Cl.
*F03B 3/12* (2006.01)
*F03B 17/06* (2006.01)

(52) U.S. Cl.
CPC ........... *F03B 17/067* (2013.01); *F05B 2240/13* (2013.01); *Y02E 10/223* (2013.01); *Y02E 10/28* (2013.01); *Y02E 10/38* (2013.01)

(58) Field of Classification Search
CPC .... F03B 3/121; F03B 17/067; F05B 2240/13; Y02E 10/28; Y02E 10/223; Y02E 10/38
USPC ............. 415/191, 7, 224, 906, 208.1; 416/84, 416/119, 197 A, 243
See application file for complete search history.

(56) References Cited

U.S. PATENT DOCUMENTS

| | | | | |
|---|---|---|---|---|
| 302,769 A | * | 7/1884 | Pallausch | 416/119 |
| 1,278,174 A | * | 9/1918 | Larimore | 415/140 |
| 2,097,286 A | * | 10/1937 | McGee | 290/54 |
| 5,051,059 A | * | 9/1991 | Rademacher | 415/7 |
| 6,877,968 B2 | * | 4/2005 | Godsall et al. | 418/268 |
| 2008/0181771 A1 | * | 7/2008 | Papp | 415/208.1 |

(Continued)

FOREIGN PATENT DOCUMENTS

| | | |
|---|---|---|
| EP | 2 133 557 | 12/2009 |
| JP | 51-69732 | 6/1976 |

(Continued)

OTHER PUBLICATIONS

Office Action issued Jun. 14, 2012 in corresponding Japanese Patent Application No. 2011-065957 with partial English translation.

(Continued)

*Primary Examiner* — Dwayne J White
*Assistant Examiner* — William Grigos
(74) *Attorney, Agent, or Firm* — Wenderoth, Lind & Ponack, L.L.P.

(57) ABSTRACT

A water wheel impeller blade type electric power generating apparatus including a rotating shaft for transmitting motive power to a power generator, a rotor fixed to the rotating shaft, an impeller blade provided on the outer periphery of the rotor to receive a flow of fluid for rotating the rotor, and a fluid guide plate inclined from above to below the rotor so as to guide the fluid to the impeller blades located on a lower portion of the rotor. The impeller blade is rotatably disposed on the rotor, a fluid receiving part and a stopper part shorter than the fluid receiving part are formed, the fluid receiving part is disposed in the upstream direction of the fluid in a fluid passage, and a bearing which rotatably supports the rotating shaft is provided on the outer periphery of the rotor.

2 Claims, 5 Drawing Sheets

(56) References Cited

U.S. PATENT DOCUMENTS

| | | | |
|---|---|---|---|
| 2009/0309368 A1* | 12/2009 | Kumano | 290/54 |
| 2011/0272946 A1* | 11/2011 | Kumano | 290/54 |

FOREIGN PATENT DOCUMENTS

| | | |
|---|---|---|
| JP | 55-40240 | 3/1980 |
| JP | 2003-314426 | 11/2003 |
| JP | 2005-155334 | 6/2005 |
| JP | 2005-330919 | 12/2005 |
| JP | 2008-248790 | 10/2008 |
| JP | 2009-228608 | 10/2009 |
| JP | 2009-270557 | 11/2009 |
| JP | 2010-151117 | 7/2010 |
| JP | 2012-2220 A * | 1/2012 |
| JP | 5389082 | 10/2012 |

OTHER PUBLICATIONS

Office Action issued Nov. 12, 2012 in corresponding Japanese Patent Application No. 2011-065957 with partial English translation.

* cited by examiner

_US 9,103,314 B2_

WATER WHEEL IMPELLER BLADE TYPE ELECTRIC POWER GENERATING APPARATUS

BACKGROUND OF THE INVENTION

1. Field of the Invention

The present invention relates to a water wheel impeller blade type electric power generating apparatus using a water stream, a sea water current or the like in, for example, a river or the sea to generate hydroelectric power.

2. Field of the Related Art

As the water wheel impeller blade type electric power generating apparatus, Patent Document 1 can be cited. This structure includes a rotating shaft for transmitting motive power to the power generator, a rotor fixed to this rotating shaft, and impeller blades which are provided on the outer periphery of this rotor for rotating the rotor by receiving a flow of fluid, and the rotating shaft is rotatably supported by a side plate of an apparatus frame body through a bearing. The impeller blades have a fluid receiving part disposed rotatably on the rotor and a stopper part shorter than this fluid receiving part, being formed in the shape of a letter L and disposed such that the fluid receiving part is on the side receiving a fluid pressure of the fluid passage and the stopper part maintains erection of the fluid receiving part.

Patent Document 1: Japanese Patent Laid-Open Publication No. 2010-151117

Since the rotating shaft is rotatably supported by the side plate of the apparatus frame body through the bearing, weights of the rotor and the large number of impeller blades and the like provided on the rotor are applied to the bearing. Moreover, since the apparatus is installed in the water or seawater, the apparatus is made of a stainless material. That causes no problem if the rotor is small-sized, but if a rotating drum of the rotor has a diameter of approximately I in and a width of approximately 1.8 m and a length of the fluid receiving part of the impeller blade is approximately 0.4 m, for example, the weights of the rotor and the impeller blades are approximately 450 Kg, and this weight is applied to the bearing through the rotating shaft. Since a heavy load is applied to the bearing as above, there has been a problem that the life of the bearing is short.

An object of the present invention is to provide a water wheel impeller blade type electric power generating apparatus which can alleviate a burden on the bearing which supports the rotor, the impeller blades and the like and prolong the life of the bearing.

SUMMARY OF THE INVENTION

In order to solve the above problems, according to the invention as stated in claim 1, there can be provided a water wheel impeller blade type electric power generating apparatus comprising: a rotating shaft for transmitting motive power to a power generator; a rotor fixed to this rotating shaft, and an impeller blade provided on the outer periphery of this rotor to receive a flow of fluid for rotating the rotor, characterized in that a fluid guide plate inclined from above to below the rotor so as to guide the fluid to the impeller blades located on a lower portion of the rotor is provided, the impeller blade is rotatably disposed on the rotor, a fluid receiving part and a stopper part shorter than this fluid receiving part are farmed in the shape of a letter L, the fluid receiving part is disposed in the upstream direction of the fluid in the fluid passage, an impeller blade passage frame body is provided to surround the rotor without impeding rotation of the impeller blades on the outer periphery of the rotor, and a scaled hollow frame body in which a sealed gas chamber by sealing a gas inside is formed is fixed to the rotating shaft in the rotor.

Advantageous Effects of the Invention

By forming the sealed gas chamber in which the gas is sealed inside the rotor, a buoyancy force is generated by this sealed gas chamber, and the load caused by the weights of the rotor and the impeller blades and the like provided on the rotor applied to a bearing can be alleviated. The volume of the sealed gas chamber is preferably set to the volume that can obtain the buoyancy force matching the weight of the rotor and the weights of the impeller blades and the like provided on the rotor, but that is not limiting.

BRIEF DESCRIPTION OF THE DRAWINGS

FIG. 5 illustrate an impeller blade, in which FIG. 5A shows a side view and FIG. 5B shows a front view.

DESCRIPTION OF THE PREFERRED EMBODIMENTS

This embodiment was obtained by improving Japanese Patent Application No. 2010-170678 by the applicant of the present invention. Thus, the configuration of the application will be described first, and then, a configuration characterizing the invention of this application will be described.

Figure 3:
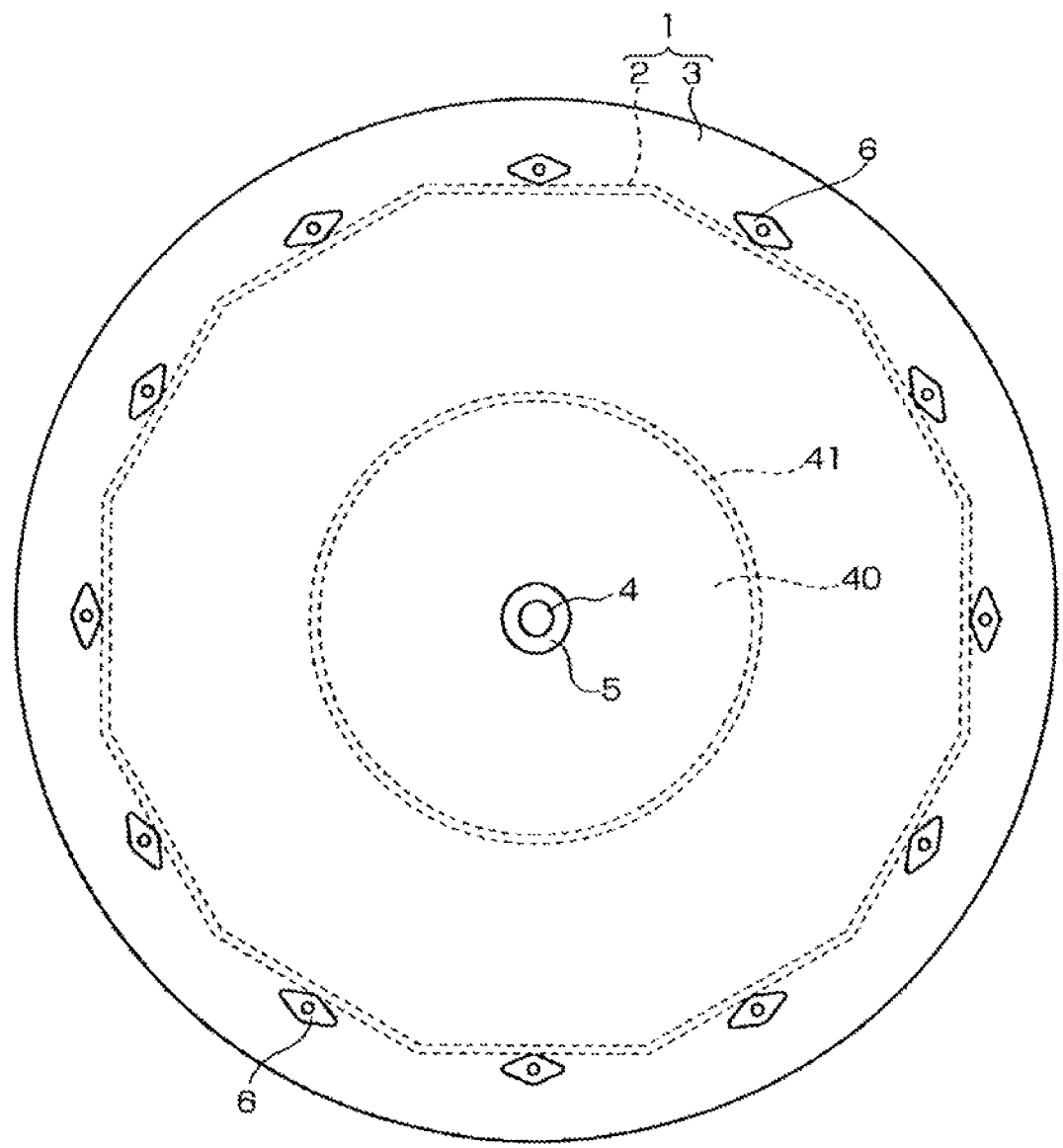
FIG. 3 is a side view of a rotor.
Figure 4:
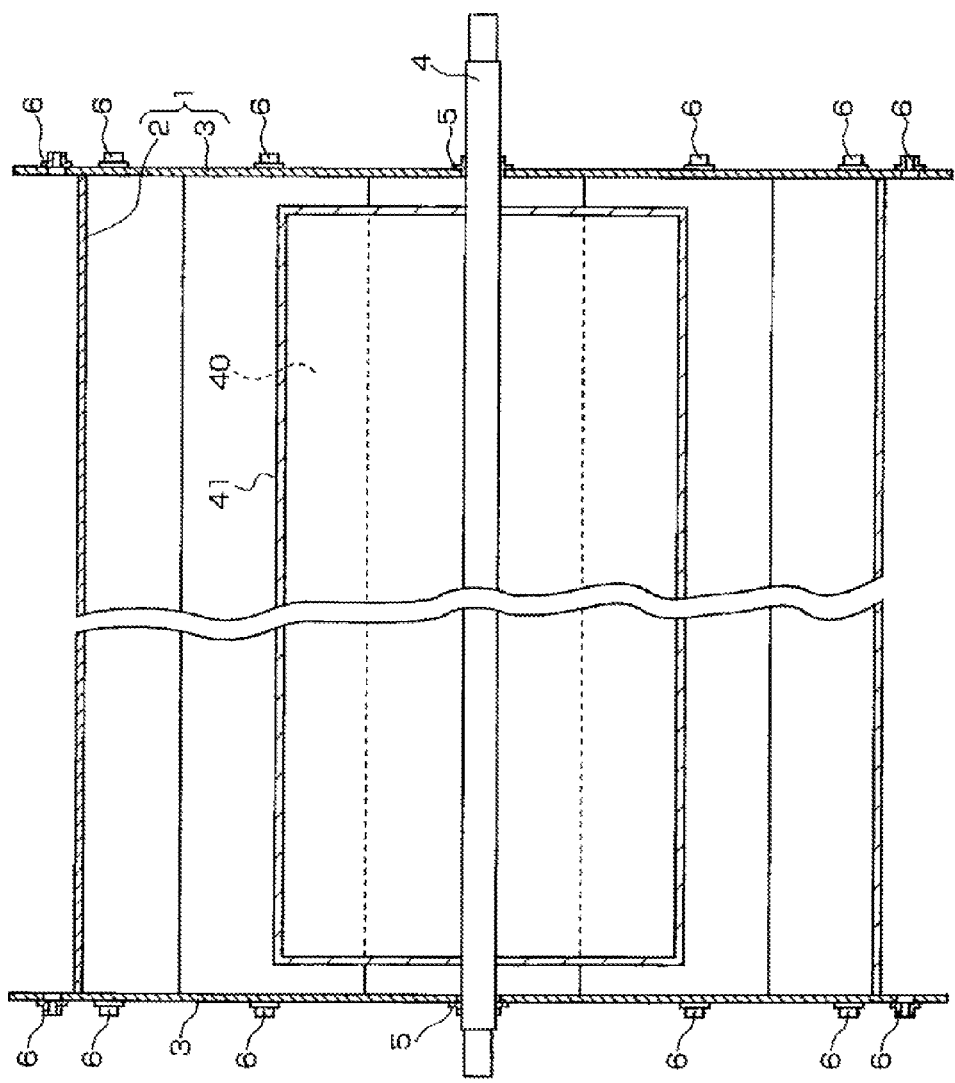
FIG. 4 is a sectional view of FIG. 3.

As illustrated in FIGS. 3 and 4, a rotor 1 includes a drum body 2 which has an outer periphery formed in the shape of a dodecahedron and a side plate 3 which is fixed to each of both sides of this drum body 2, the outside diameter of the side plate 3 being larger than that of the drum body 2, The side plate 3 is fixed to a rotating shaft 4 by means of a fixing member 5. In the portion, which is projected upward from the drum body 2 of the side plate 3, a bearing 6 is fixed in twelve places corresponding to the respective sides of the dodecahedron.

Figure 1:
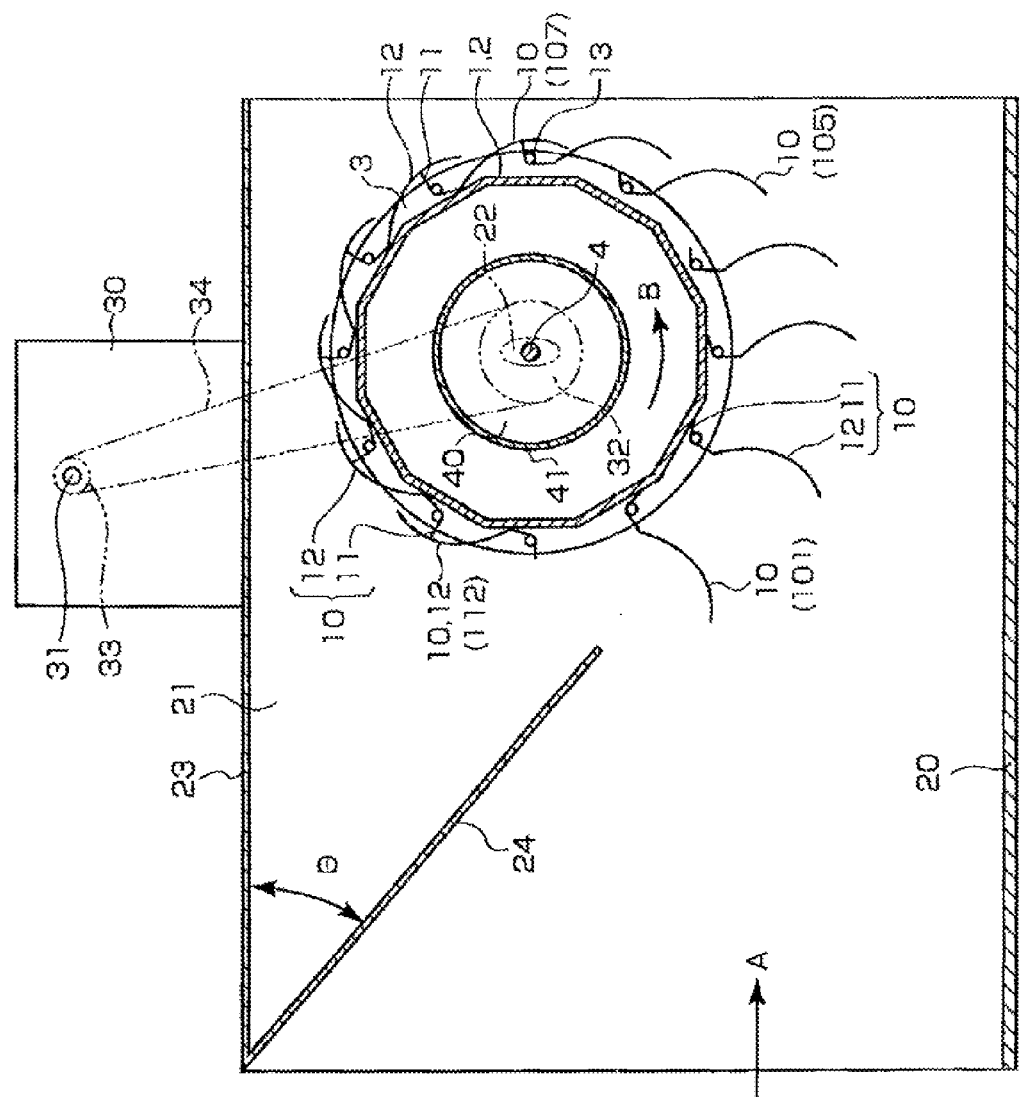
FIG. 1 is a sectional view illustrating an outline configuration of an embodiment of a water wheel impeller blade type electric power generating apparatus of the present invention.
Figure 5:
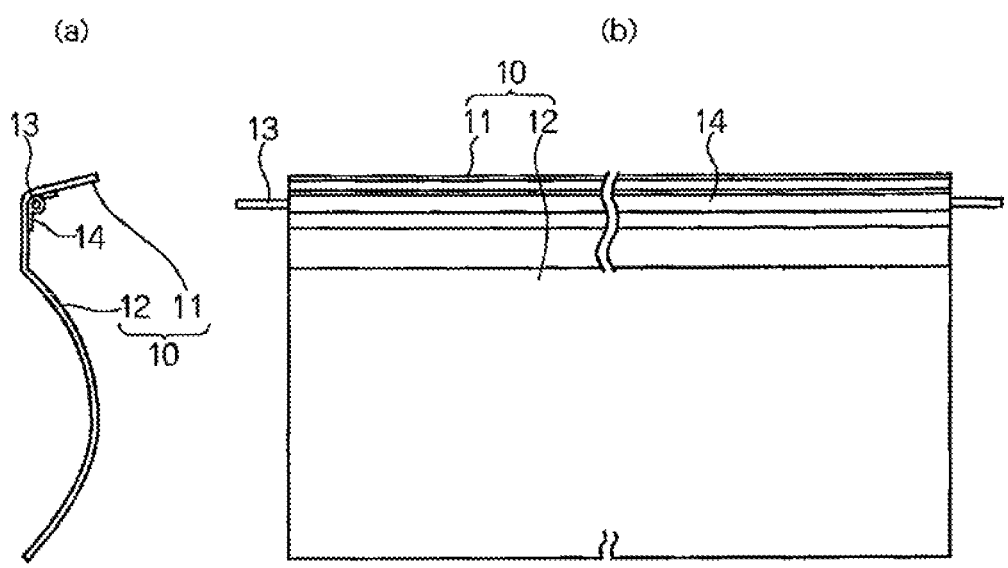

To the rotor 1, an impeller blade 10 as shown in FIG. 5 is mounted. The impeller blade 10 is comprised of a stopper part 11 with a short length and a fluid receiving part 12, which arises from this stopper part 11, and the fluid receiving part 12 is disposed on the fluid upstream side. A support shaft 13 of the impeller blade 10 is fixed by a fixing member 14, and the both end parts of the support shaft 13 are rotatably supported by means of the bearings 6 which are disposed oppositely to each other. The fluid receiving surface side of the fluid receiving part 12 is concaved in the shape of a circular arc such that it can receive a large volume of fluid when the fluid receiving part 12 is erected with the stopper part 11 being butted against the drum body 2 of the rotor 1. As illustrated in FIG. 1, the fluid receiving part 12 is provided with a length large enough to cover the stopper part 11 and the lower portion of the fluid receiving part 12 of the impeller blade 10 given on the thrust down side when the impeller blade 10 is thrust down.

Figure 2:
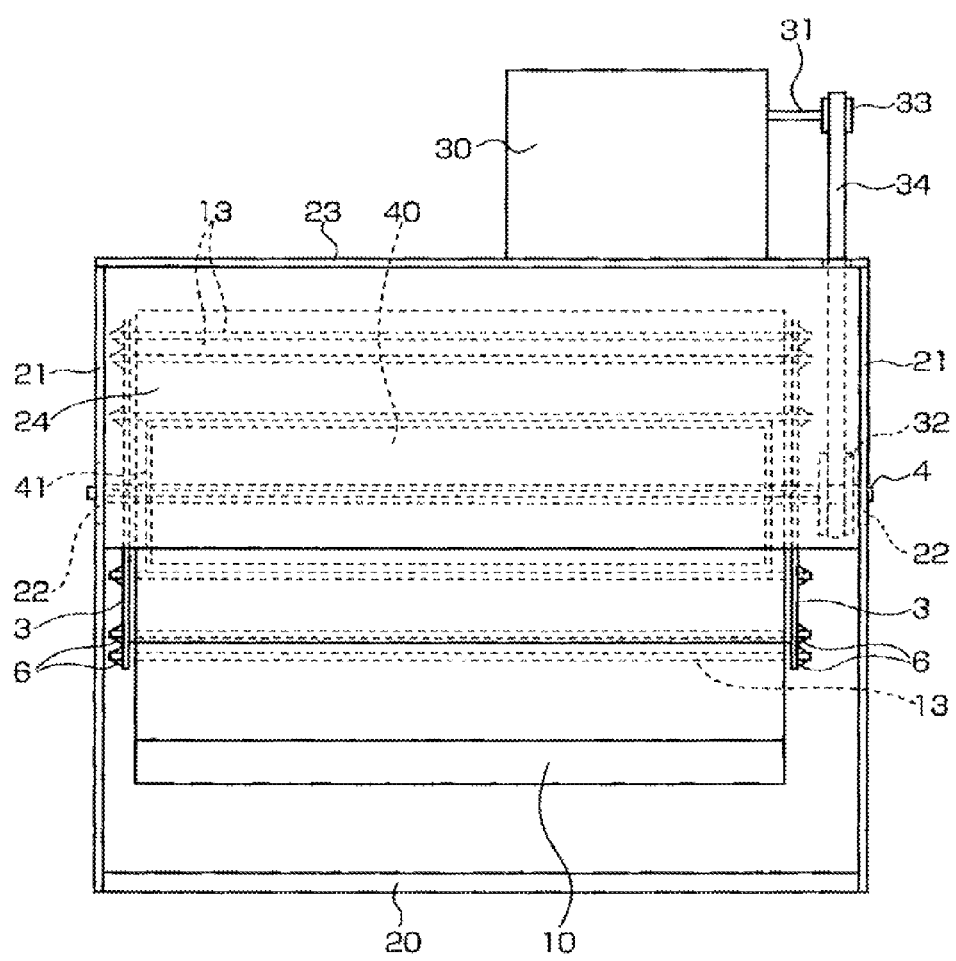
FIG. 2 is a front view of FIG. 1.

As illustrated in FIGS. 1 and 2, the rotating shaft 4 of the rotor 1 to which the impeller blades 10 are mounted is rotatably supported by means of a side plate 21 which is fixed on both sides of a bottom plate 20 through a bearing 22. On both side plates 21, a top plate 23 is fixed. In other words, the bottom plate 20, side plates 21 and top plate 23 constitute a frame body of the apparatus. To the front-end part of the top plate 23, a fluid guide plate 24 is fixed with inward inclination. Herein, the fluid guide plate 24 is provided with a length and inclination angle large enough to guide the fluid flowing in a direction A to the impeller blades 10 positioned under the rotating shaft 4.

Above the top plate 23, a power generator 30 is fixed such that an input shaft 31 of the power generator 30 is in parallel with the rotating shaft 4. To one end part of the rotating shaft 4 and the input shaft 31, gears 32, 33 are fixed, respectively, and a chain 34 is extended between the gears 32, 33.

Next, the function of the apparatus will be described. Once the apparatus is fixed at a predetermined position underwater or undersea such that the fluid guide plate 24 faces the flowing direction A of the fluid flow, the fluid guided by the fluid guide plate 24 and the fluid flowing under the fluid guide plate 24 are butted against the fluid receiving part 12 of the impeller blades 10 (101 to 105) positioned under, the rotating shaft 4, resulting in the rotor 1 and the rotating shaft 4 being rotated in the direction of arrow B. The rotation of the rotating shaft 4 is transmitted to the input shaft 31 through the gears 32, 33 and the chain 34, thereby the power generator 30 generates electric power.

The fluid receiving part 12 is longer and heavier than the stopper part 11, and thus, the impeller blades 10 (107 to 112) positioned above the rotating shaft 4 are naturally thrust down by their own weight. In other words, when the impeller blade 10 is thrust down, the fluid receiving area for receiving the fluid of the impeller blade 10 is substantially reduced, whereby, on the backward motion side, the resistance of the impeller blade 10 to the fluid is reduced. In addition, when the impeller blade 10 is thrust down, the fluid receiving part 12 covers the stopper part 11 and the lower portion of the fluid receiving part 12 of the subsequent impeller blade 10, being butted against the stopper part 11 thereof. This also reduces the resistance of the impeller blade 10 to the fluid on the backward motion side.

In addition to the above-mentioned advantageous effects, the present apparatus exerts the following ones. The fluid guide plate 24 will cause the fluid to flow under the rotor 1, whereby the mud, sand, dirt and the like in the river will not be collected into the water wheel (including the rotor 1 and the impeller blades 10). In addition, the rotor 1 is constituted by components having simple geometries, and further, the stopper part 11 and the fluid receiving part 12 can be manufactured as an integral part, and thus, the apparatus allows a substantial reduction in a manufacturing cost.

Next, the configuration of the invention of this application will be described. In this embodiment, a sealed hollow frame body 41 having a cylindrical shape and made of a stainless material so as to form a sealed gas chamber 40 is fixed to the rotating shaft 4 inside the rotor 1 constituted by the drum body 2 and the both side plates 3 and 3. Air is sealed inside the sealed gas chamber 40 or a gas with large buoyancy force such as nitrogen gas, carbon oxide gas or the like is sealed therein.

By forming the sealed gas chamber 40 in which the gas is sealed inside the rotor 1 as described above, a buoyancy force is generated by this sealed gas chamber 40, and the load caused by the weights of the rotor 1 and the impeller blades 10 and the like provided on the rotor 1 applied to a bearing 22 can be alleviated. The volume of the sealed gas chamber 40 is preferably set to the volume that can obtain the buoyancy force matching the weight of the rotor 1 and the weights of the impeller blades 10 and the like provided on the rotor 1. If the weight of the rotor 1 and the impeller blades 10 and the like provided on the rotor 1 is 450 Kg, for example, the volume is set to approximately 0.45 m$^3$ (the cube of 0.45 in). However, in this embodiment, it is not necessary to match the load applied to the bearing 22 with the buoyancy force of the sealed gas chamber 40. That is, it is only necessary to reduce the load applied to the bearing 22.

In each of above-mentioned embodiments, the drum body 2 is formed in the shape of a dodecahedron and 12 impeller blades 10 are provided, but the number of the impeller blades 10 is not limited. Moreover, the drum body 2 does not have to have a square shape but may have a circular shape.

The invention claimed is:

1. A water wheel impeller blade type electric power generating apparatus, comprising:
   a frame body including a bottom plate, side plates fixed to both sides of the bottom plate, and a top plate fixed onto the side plates;
   a rotating shaft for transmitting motive power to a power generator, the rotating shaft being rotatably supported on the side plates by a bearing of the rotating shaft;
   a rotor fixed to the rotating shaft;
   a plurality of impeller blades provided on an outer periphery of the rotor to receive a flow of fluid for rotating the rotor;
   wherein the impeller blades are rotatably disposed on the rotor by bearings of the impeller blades, each of the impeller blades comprising a fluid receiving part and a stopper part that is shorter than the fluid receiving part, the fluid receiving part and the stopper part are formed into an L-shape, and the fluid receiving part is configured to be disposed in an upstream direction of the fluid;
   wherein each fluid receiving part is formed longer and heavier than each stopper part and is configured such that when a portion of the impeller blades is rotated above the rotating shaft, the impeller blades are spontaneously thrust down by their own weight, and a fluid receiving area for receiving the fluid of the impeller blades is substantially reduced so as to reduce resistance of the impeller blades to the fluid on a backward motion side and is configured such that when the portion of the impeller blades rotated above the rotating shaft have been thrust down the fluid receiving part of one impeller blade of the plurality of impeller blades covers the stopper part and a lower portion of the fluid receiving part of a next impeller blade of the plurality of impeller blades to bring the fluid receiving part of the one impeller blade into abutment on the stopper part of the next impeller blade so as to further reduce the resistance of the impeller blades to the fluid on the backward motion side;
   a fluid guide plate formed to have a length inclined from above toward below the rotor so as to guide the fluid to the impeller blades under a lower portion of the rotor and inclined so as to guide the fluid in a fluid flowing direction, the fluid guide plate is provided on a front end part of the top plate such that the fluid that has been guided by the fluid guide plate and the fluid that flows under the fluid guide plate butt against the fluid receiving parts of the impeller blades, such that when the rotor and the rotating shaft are rotated, collection of undesired materials into the rotor and the impeller blades is substantially reduced; and
   a sealed hollow frame body including a sealed gas chamber sealing therein a gas that is large in buoyancy force, the sealed hollow frame body being fixed to the rotating shaft in the rotor, and a volume of the sealed gas chamber being configured to a magnitude for obtaining a buoyancy force matching the weight of the rotor and impeller blades, the buoyancy force being generated by the sealed gas chamber itself formed in the rotor so as to alleviate a load applied to the bearing by the weight of the rotor and impeller blades.

2. The water wheel impeller blade type electric power generating apparatus of claim 1, wherein the gas comprises air, nitrogen gas, or carbon oxide gas.

* * * * *